United States Patent
Cheng et al.

(10) Patent No.: US 6,802,021 B1
(45) Date of Patent: Oct. 5, 2004

(54) INTELLIGENT LOAD BALANCING FOR A MULTI-PATH STORAGE SYSTEM

(75) Inventors: Eric Cheng, San Ramon, CA (US); Yafu Ding, Milpitas, CA (US); Chang-Tying Wu, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 637 days.

(21) Appl. No.: 09/768,957

(22) Filed: Jan. 23, 2001

(51) Int. Cl.[7] .............................................. G06F 11/00
(52) U.S. Cl. ........................................ 714/4; 710/316
(58) Field of Search ............................ 714/7, 3, 4, 26; 710/316

(56) References Cited

U.S. PATENT DOCUMENTS

| | | | | |
|---|---|---|---|---|
| 6,145,028 A | * | 11/2000 | Shank et al. ................... | 710/31 |
| 6,341,356 B1 | * | 1/2002 | Johnson et al. ................ | 714/4 |
| 6,408,348 B1 | * | 6/2002 | Blount et al. .................. | 710/38 |
| 6,434,637 B1 | * | 8/2002 | D'Errico ........................ | 710/38 |
| 6,601,128 B1 | * | 7/2003 | Burton et al. ................. | 710/316 |
| 2002/0065962 A1 | * | 5/2002 | Bakke et al. .................. | 710/38 |

* cited by examiner

Primary Examiner—Robert Beausoliel
Assistant Examiner—Marc Duncan
(74) Attorney, Agent, or Firm—Martine & Penilia, LLP

(57) ABSTRACT

An invention is disclosed for intelligent load balancing in a mult-path computer system. Initially, an input/output (I/O) request to access the computer I/O device is intercepted. Then, to properly balance data path traffic, the number of I/O requests that have been sent along each data path of a plurality of data paths providing access to the computer I/O device is detected, and a failure probability is calculated for each data path paths based on the number of I/O requests that have been sent along each data path. A data path is then selected that has a failure probability lower than the failure probability of other data paths of the plurality of data paths and the computer I/O device is accessed using the selected data path.

31 Claims, 10 Drawing Sheets

INTELLIGENT LOAD BALANCING FOR A MULTI-PATH STORAGE SYSTEM

CROSS REFERENCE TO RELATED APPLICATIONS

This application is related to: (1) U.S. patent application Ser. No. 09/768,860, filed Jan. 23, 2001, entitled "METHOD AND APPARATUS FOR A SEGREGATED INTERFACE FOR PARAMETER CONFIGURATION IN A MULTI-PATH FAILOVER SYSTEM;" and (2) U.S. patent application Ser. No. 09/768,859, filed Jan. 23, 2001, entitled "METHOD AND APPARATUS FOR INTELLIGENT FAILOVER IN A MULTI-PATH SYSTEM." Each of these disclosures is incorporated herein by reference in its entirety.

BACKGROUND OF THE INVENTION

1. Field of the Invention

This invention relates generally to computer storage, and more particularly to load balancing techniques in a multi-path storage systems.

2. Description of the Related Art

Computer storage systems, such as disk drive systems, have grown enormously in both size and sophistication in recent years. These systems typically include many large storage units controlled by a complex multi-tasking controller. Large scale computer storage systems generally can receive commands from a large number of host computers and can control a large number of mass storage elements, each capable of storing in excess of several gigabytes of data.

FIG. 1 is an illustration showing a prior art computer storage system 100. The prior art computer storage system 100 includes computer systems 102, 104, and 106, and workstations 108 and 110 all coupled to a local area network 112. The computer systems 102, 104, and 106 are also in communication with storage devices 114 via a storage area network 116. Generally, the computer systems 102, 104, and 106 can be any computer operated by users, such as PCs, Macintosh, or Sun Workstations. The storage devices can be any device capable of providing mass electronic storage, such as disk drives, tape libraries, CDs, or RAID systems.

Often, the storage area network 116 is an Arbitrated Loop, however, the storage area network 116 can be any storage area network capable of providing communication between the computer systems 102, 104, and 106, and the computer storage devices 114. Another typical storage area network is a Fabric/switched storage area network, wherein the storage area network 116 comprises several nodes, each capable of forwarding data packets to a requested destination.

In use, the computer systems 102, 104, and 106 transmit data to the storage devices 114 via the storage area network 116. The storage devices 114 then record the transmitted data on a recording medium using whatever apparatus is appropriate for the particular medium being used. Generally the conventional computer storage system 100 operates satisfactorily until a failure occurs, which often results in data loss that can have catastrophic side effects.

It is more than an inconvenience to the user when the computer storage system 100 goes "down" or off-line, even when the problem can be corrected relatively quickly, such as within hours. The resulting lost time adversely affects not only system throughput performance, but also user application performance. Further, the user is often not concerned whether it is a physical disk drive, or its controller that fails, or if there is no drive response because too much data has been sent down the data to the storage device. It is the inconvenience and failure of the system as a whole that causes user difficulties.

As the systems grow in complexity, it is increasingly less desirable to have interrupting failures at either the device or at the controller level. Further, storage devices, such as disks, may be limited by the number of access or retrieval streams capable of accessing the files on the storage devices. When a large number of users demand access to files on a disk, their access may require the use of all available retrieval streams to the disk, and a condition known as disk bottlenecking will occur. Essentially, with a bottlenecked disk, no bandwidth is available to service any further user requests from that disk. Disk bottlenecking, or as it is sometimes referred, load imbalancing, typically occurs when user demand for access to files on a disk is greater than the number of retrieval streams capable of accessing the files. When disk bottlenecking occurs a particular number of users desiring access to the files on the disk are incapable of accessing the desired files due to the unavailability of retrieval streams.

In view of the foregoing, there is a need for method that can provide load balancing for storage devices. The method should have the capability to automatically detect the failure and load imbalance and act to address the failure or imbalance in manner that is transparent to the user. The method should be capable of increasing system reliability while not interfering with the production of the user.

SUMMARY OF THE INVENTION

Broadly speaking, the present invention fills these needs by providing an intelligent load balancing method that balances traffic among data paths providing access to a specific I/O device. In addition to load balancing, the embodiments of the present invention further detect data path errors and modify data path selection based on both I/O traffic and data path status, such as connection state. In one embodiment, a method is disclosed for intelligent load balancing in a mult-path computer system. Initially, an input/output (I/O) request to access the computer I/O device is intercepted. Then, to properly balance data path traffic, the number of I/O requests that have been sent along each data path of a plurality of data paths providing access to the computer I/O device is detected, and a failure probability is calculated for each data path paths based on the number of I/O requests that have been sent along each data path. A data path is then selected that has a failure probability lower than the failure probability of other data paths of the plurality of data paths and the computer I/O device is accessed using the selected data path.

In another embodiment, a system for providing intelligent load balancing in a multi-path computer system is disclosed. The system includes a processor and a computer I/O device in communication with the processor via a plurality of data paths. Further included in the system is a failover filter driver that is in communication with the plurality of data paths. The failover filter driver can determine the number of I/O requests previously sent using each data path in the plurality of data paths. In addition, the failover filter driver can perform load balancing by selecting a particular data path from the plurality of data paths based on the number of I/O requests sent using each data path.

In a further embodiment, a failover filter driver for providing intelligent load balancing in a mulit-path computer system is disclosed. The failover filter driver includes an intercept code module that intercepts I/O requests to a computer I/O device from an operating system. In addition, a manual-select code module is included that selects a data path from a plurality of data paths to the computer I/O device based on data path information provided from a requesting computer application. Further, an auto-select code module is included that selects a data path from the plurality of data paths based on the number of I/O requests previously sent along each data path in the plurality of data paths.

Advantageously, the embodiments of the present invention provide intelligent load balancing in multi-path computer systems, which results in greatly increased reliability. Since multiple data paths to a particular storage device can increase the reliability of successful I/O requests to the device if properly balanced, the ability to automatically detect failures and perform load balancing among the data paths greatly increases system reliability. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an intelligent load balancing system in a multi-path storage system. To this end, embodiments of the present invention provide a failover filter driver capable of re-directing input/output (I/O) requests to balance loads among the data paths providing access to a particular I/O device. In addition, the embodiments of the present invention provide logical unit number (LUN) masking to hide redundant logical storage device paths from the operating system. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
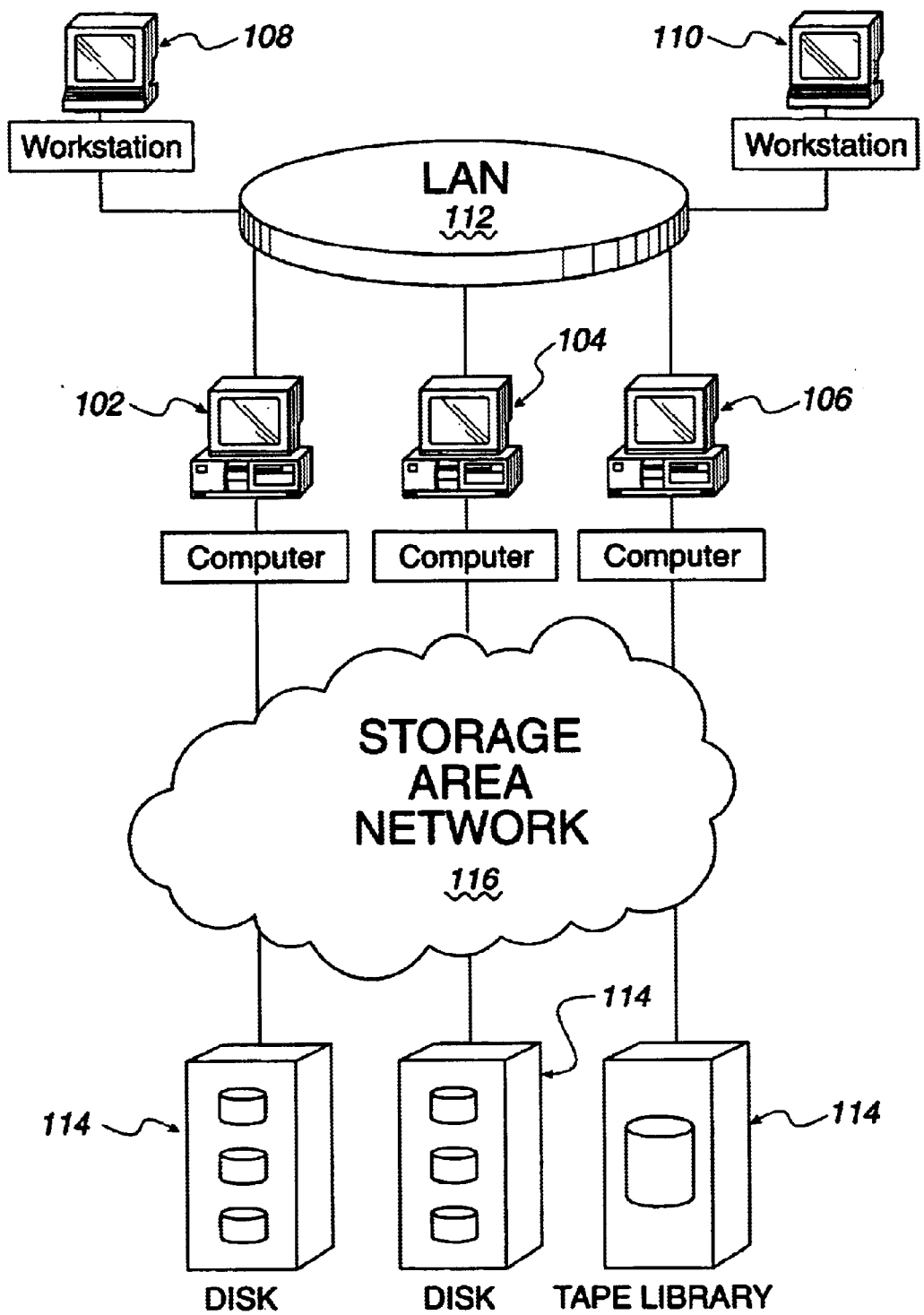
FIG. 1 is an illustration showing a prior art computer storage system.
Figure 2A:
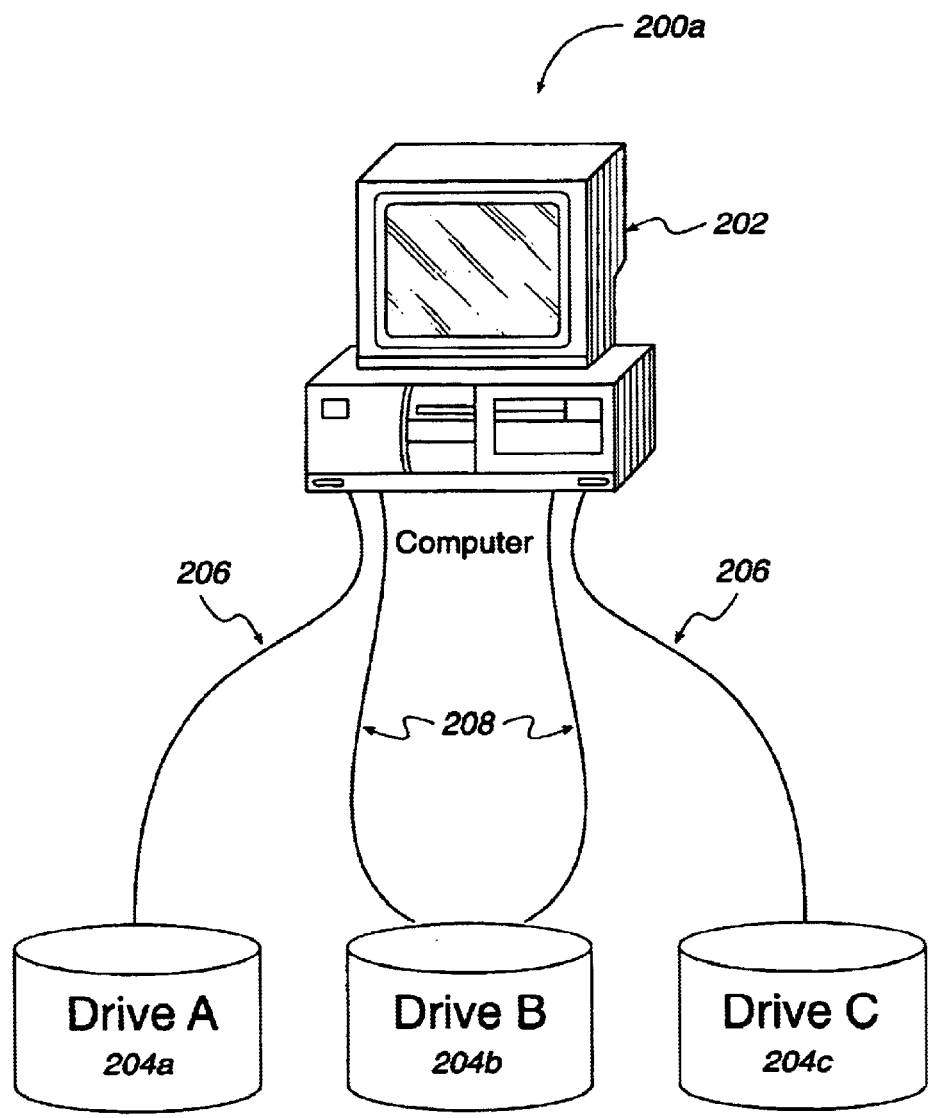
FIG. 2A is an illustration showing a computer storage system, in accordance with an embodiment of the present invention.

FIG. 2A is an illustration showing a computer storage system 200a, in accordance with an embodiment of the present invention. The computer storage system 200a includes a computer system 202 coupled to computer storage devices 204a, 204b, and 204c via data paths 206 and 208. In particular, computer storage devices 204a and 204c are coupled to the computer system 202 via single-path data paths 206, and computer storage device 204b is coupled to the computer system 202 via the multi-path data path 208.

The computer system 202 typically is any computer operated by users, such as PCs, Macintosh, or Sun Workstations. However, it should be borne in mind that the computer system 202 can actually be any type of processor that can be put in communication with the storage devices 204a, 204b, and 204c. The storage devices 204a, 204b, and 204c typically are disk drives, however, the storage devices 204a, 204b, and 204c can be any computer device capable of mass storage, such as a tape drives, CDs, or RAID systems.

The data paths 206 and 208 represent any type of data path capable of coupling the computer system 202 to the computer storage devices 204a, 204b, and 204c, such as a simple transport or computer network system. Often, the data paths 206 and 208 reside in an Arbitrated Loop, however, the data paths can also reside in any storage area network (SAN) capable of providing communication between the computer system 202 and the computer storage devices 204a, 204b, and 204c. Another typical computer network wherein the data paths 206 and 208 can reside is a Fabric/Switched SAN, wherein each data path comprises several nodes, each capable of forwarding data packets to a requested destination.

In use, the computer system 202 transmits data to the storage devices 204a and 204c via the single-path data paths 206. The storage devices 204a and 204c then record the transmitted data on their recording medium using whatever apparatus is appropriate for the particular medium being used. In addition, the computer system 202 transmits data to the storage device 204b using the multi-path data path 208. The multi-path data path 208 comprises two or more single-path data paths, each of which couples the computer system 202 to the storage device 204b.

As explained in greater detail subsequently, embodiments of the present invention utilize a failover filter driver to coordinate I/O requests between the various data paths comprising each multi-path data path 208. More particularly, the failover filter driver intercepts I/O requests from an operating system (OS) executing on the computer system 202. Each I/O request is then routed to the particular storage device 204a, 204b, or 204c desired by the OS. When the I/O request is destined for a storage device coupled to the computer system via a mulit-path data path, such as data path 208, the failover filter driver uses load balancing to determine the best data path of the plurality of data paths comprising the multi-path data path 208 to use to access the storage device.

Figure 2B:
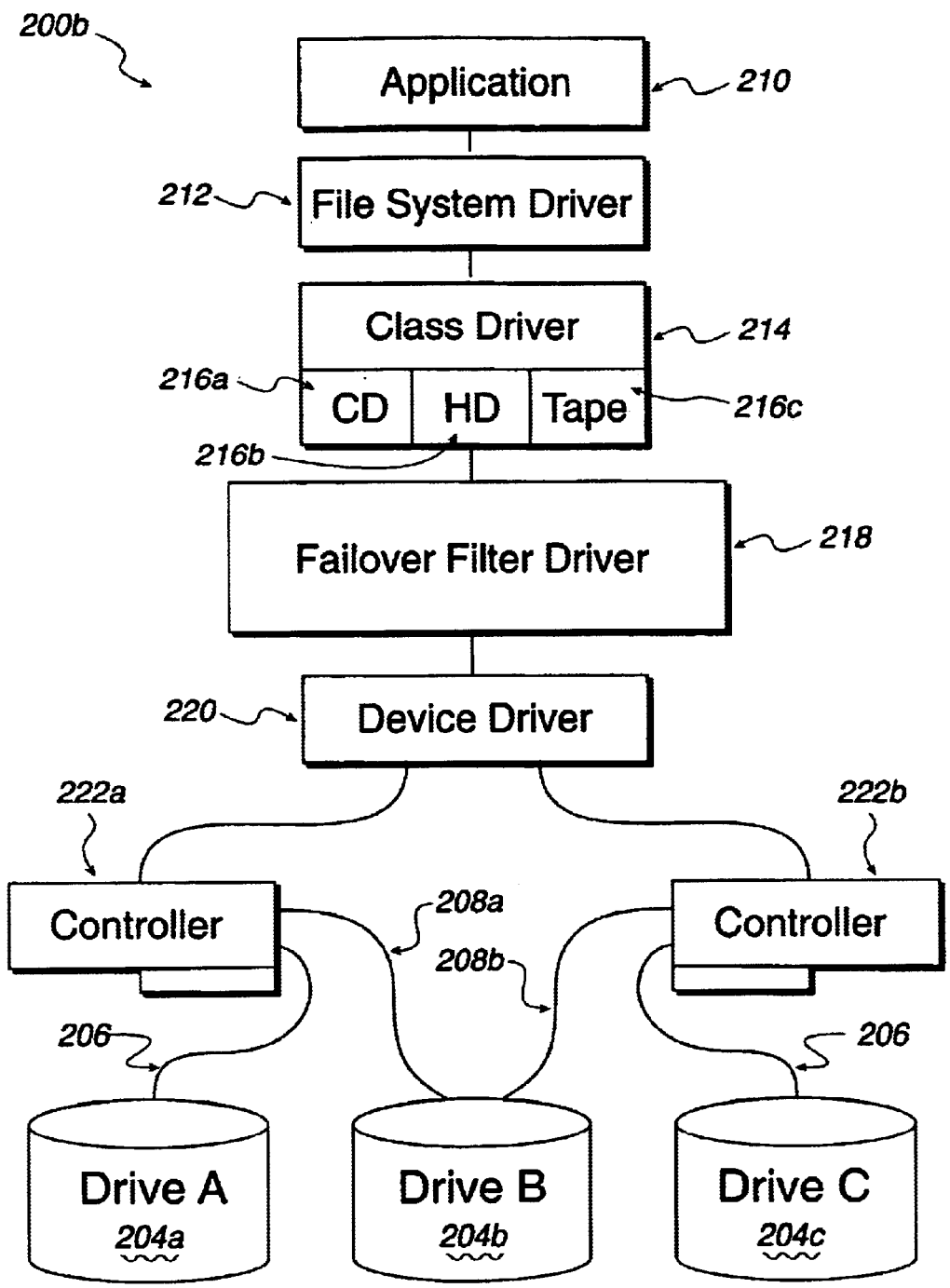
FIG. 2B is an illustration showing a multi-path computer storage system having an intelligent load balancing system, in accordance with an embodiment of the present invention.

FIG. 2B is an illustration showing a multi-path computer storage system 200b having an intelligent load balancing system, in accordance with an embodiment of the present invention. The multi-path computer storage system 200b includes an application program 210 executing in an OS environment having a file system driver 212. In communication with the file system driver 212 is a class driver 214. The class driver 214 is also in communication with a failover filter driver 218, which manages and delivers I/O requests to device driver 220. The device driver 220 provides communication to controllers 222a and 222b, which are coupled to, and control, storage devices 204a, 204b, and 204c.

The application program 210 can be any application program executing on the computer system comprising the computer storage system, such as a word-processing application or directory viewing application, such as WINDOWS EXPLORER. Optionally, the application program can be omitted, and the I/O requests initiated by the OS itself. The file system driver 212 helps manage the file I/O for the computer system using the class driver 214.

The class driver 214 can be any class driver designed to operate with the storage devices being used in conjunction with the computer storage system 200b. As shown in FIG. 2B, each class driver 214 is designed to operate in conjunction with a particular storage device, such a CD 216a, a disk drive 216b, or a tape drive 216c. The device driver 220 provides the OS access to the storage devices of the computer system. Each driver is a program that interacts with a particular storage device or special type of software, and includes specialized knowledge of the device or special software interface that programs using the driver do not have. During operation, each device driver creates a device object for the device associated with the device driver. The device object defines the related device and the data path used to access the device. Hence, in use each storage device 204a, 204b, and 204c will have an associated device object, which is used by the operating system to access the associated device. More specifically, storage device 204b will have two related device objects, one for each data path 208a and 208b providing access to the storage device 204b.

Each controller 222a and 222b provides hardware management to each storage device coupled to the controller. Each controller 222a and 222b can be incorporated in the motherboard of the related computer system, or embodied on a host adapter card, as shown in FIG. 2B. When embodied on a host adapter card, the controller and attached host adapter card are fitted into a vacant slot on the motherboard and can be removed or replaced as needed by the system operator.

As explained previously, the storage devices 204a, 204b, and 204c typically are disk drives, however, the storage devices 204a, 204b, and 204c can be any computer device capable of mass storage, such as a tape drives, CDs, or RAID systems. Each storage device is coupled to the controllers 222a and 222b by data paths 206 and 208a–b, which represent any type of data path capable of coupling the controllers 222a and 222b to the computer storage devices 204a, 204b, and 204c, such as a simple transport or computer network system. As mentioned previously, the data paths 206 and 208a and 208b often reside in an Arbitrated Loop, however, the data paths can also reside in any storage area network such as a Fabric/Switched SAN, wherein each data path comprises several nodes, each capable of forwarding data packets to a requested destination.

In operation, the application program 210 accesses stored data using the OS, which sends I/O request via the file system driver 212 and the class driver 214 for the particular storage device to be accessed. For example, if the storage devices 204a, 204b, and 204c are disk drives, the class driver for disk drives 216b would be used. The I/O request is then intercepted by the failover filter driver 218, which examines the I/O request and the data paths coupling the target device to the computer system to determine which data path to use to access the requested storage device.

Specifically, the failover filter driver 218 is an intermediate kernal mode driver that exists above the device driver 220, and below the class driver 214. The failover filter driver 218 attaches any device objects it creates to the device objects created by the device driver 220. I/O requests destined for a particular device driver and associated with a device object originally created by the device driver are sent to the failover filter driver 218, which is associated with the "attached" device object. In this manner, the failover filter driver 218 is able to intercept I/O requests destined for the storage devices 204a, 204b, and 204c coupled to the computer system. The failover filter driver 218 then determines whether to block the I/O request, reroute the I/O request to an alternate data path, or pass the I/O request to the original data path.

FIGS. 3A–3D illustrate various computer storage device configurations for an intelligent failover system, in accordance with various embodiments of the present invention. In particular, the following illustrations show various exemplary embodiments of the present invention, each capable of providing failover for increased system reliability.

The following configurations are suitable for use with a Fibre Channel protocol and network storage system. Fibre Channel is a high-speed transmission technology that can be used as a front-end communications network, a back-end storage network, or both at the same time. Fibre Channel is often used for storage area networks (SANs) for connecting multiple hosts to dedicated storage systems. With Fibre Channel, the hosts can not only talk to the storage system via SCSI, but the hosts can talk to each other via IP over the same network. Fibre Channel supports existing peripheral interfaces and communications protocols, including SCSI, IPI, HiPPI and IP, and not only supports singlemode and multimode fiber connections, but coaxial cable and twisted pair as well. Further, Fibre Channel supports transmission rates of 133, 266 and 531 Mbps and 1.06, 2.12 and 4.25 Gbps in each direction and uses the same FC-0 physical layer as Gigabit Ethernet. Using IBM's 8B/10B encoding method, each byte of data is transmitted as 10 bits.

Figure 3A:
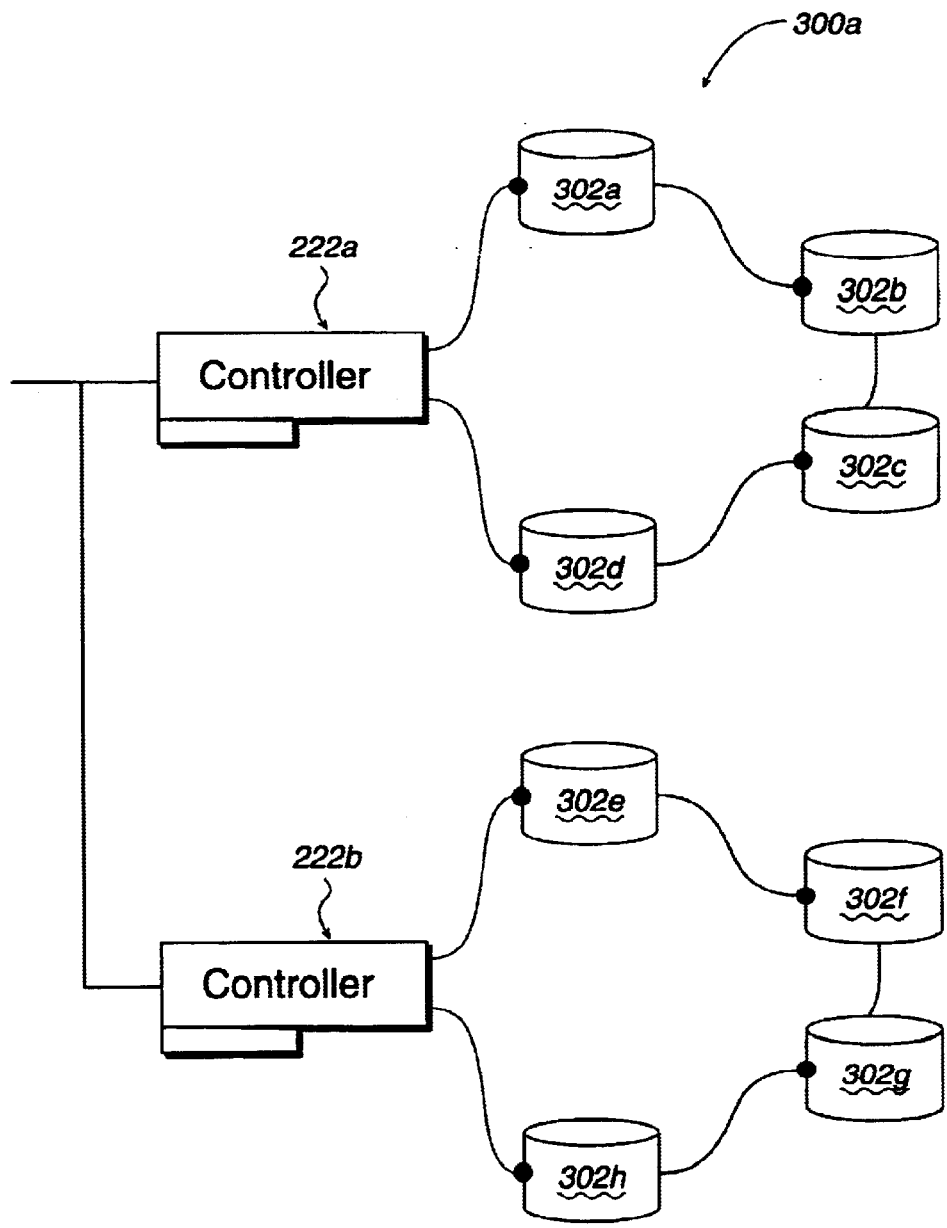
FIG. 3A is a diagram showing a two-loop storage configuration for an intelligent failover system, in accordance with an embodiment of the present invention.

FIG. 3A is a diagram showing a two-loop storage configuration 300a for an intelligent failover system, in accordance with an embodiment of the present invention. The two-loop storage configuration 300a includes controllers 222a and 222b. Controller 222a is coupled serially to storage devices 302a, 302b, 302c, and 302d. Further, the first storage loop connects back to controller 222a. Similarly, controller 222b is coupled serially to storage devices 302e, 302f, 302g, and 302h, which connects back to controller 222b. The two-loop storage configuration 300a can be used in conjunction with a Fibre Channel network system, which allows for arbitrated loop (FC-AL) with or without a hub, and can connect about 127 nodes.

Figure 3B:
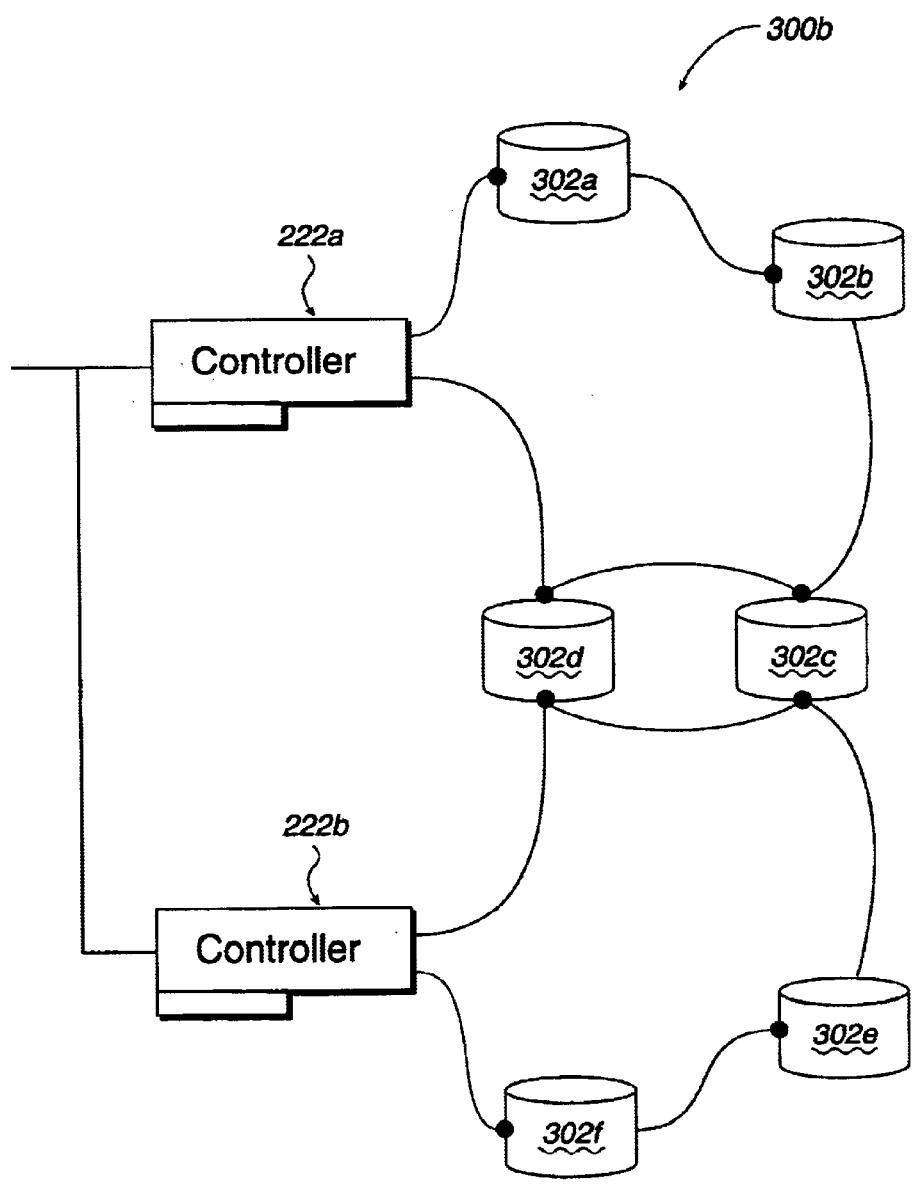
FIG. 3B is a diagram showing a shared loop storage configuration, in accordance with an embodiment of the present invention.

FIG. 3B is a diagram showing a shared loop storage configuration 300b, in accordance with an embodiment of the present invention. The shared loop storage configuration 300b includes controller 222a and 222b. Controller 222a is coupled serially to storage devices 302a, 302b, 302c, and 302d, which is connected back to controller 222a. Similarly, controller 222b is coupled serially to storage devices 302d, 302c, 302e, and 302f, which is connected back to controller 222b. As shown in FIG. 3B, storage devices 302d and 302c are coupled to both to controllers 222a and 222b, thus creating two shared arbitrated loops.

Figure 3C:
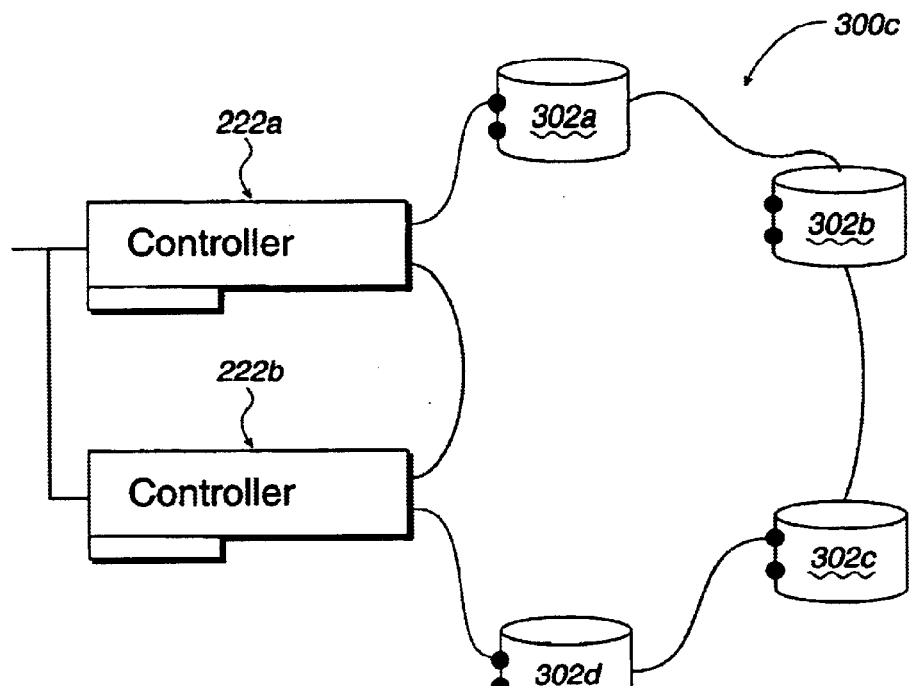
FIG. 3C is a diagram showing a one-loop storage configuration, in accordance with an embodiment of the present invention.

FIG. 3C is a diagram showing a one-loop storage configuration 300c, in accordance with an embodiment of the present invention. The one-loop storage configuration 300c includes controllers 222a and 222b. Controller 222a is directly coupled to both controller 222b and to storage device 302a, which is coupled serially to storage device 302b, 302c, and 302d, which is coupled to controller 222b, thus forming a single arbitrated loop.

Figure 3D:
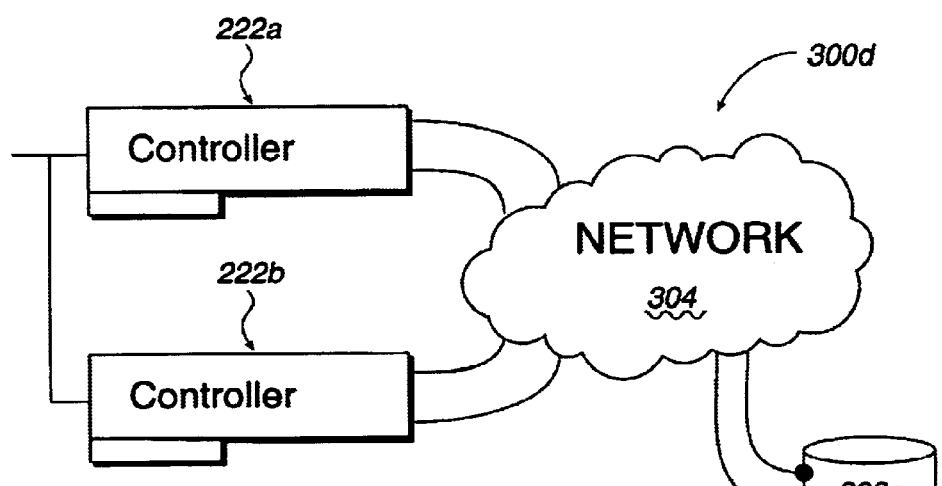
FIG. 3D is a diagram showing a fabric storage configuration, in accordance with an embodiment of the present invention.

FIG. 3D is a diagram showing a fabric storage configuration 300d, in accordance with an embodiment of the present invention. The fabric storage configuration 300d includes controllers 222a and 222b, each coupled to a computer network, or fabric 304. Further, storage device 302a is coupled to the fabric 304. The fabric storage configuration 300d illustrates how a plurality of data paths can easily be created for communication with a storage device using a computer network 304.

Although FIGS. 3A–3D have been described in terms of Fibre Channel, it should be borne in mind that the embodiments of the present invention can be used with any protocol, or with no protocol at all when a computer system is not coupled to a computer network.

Figure 4:
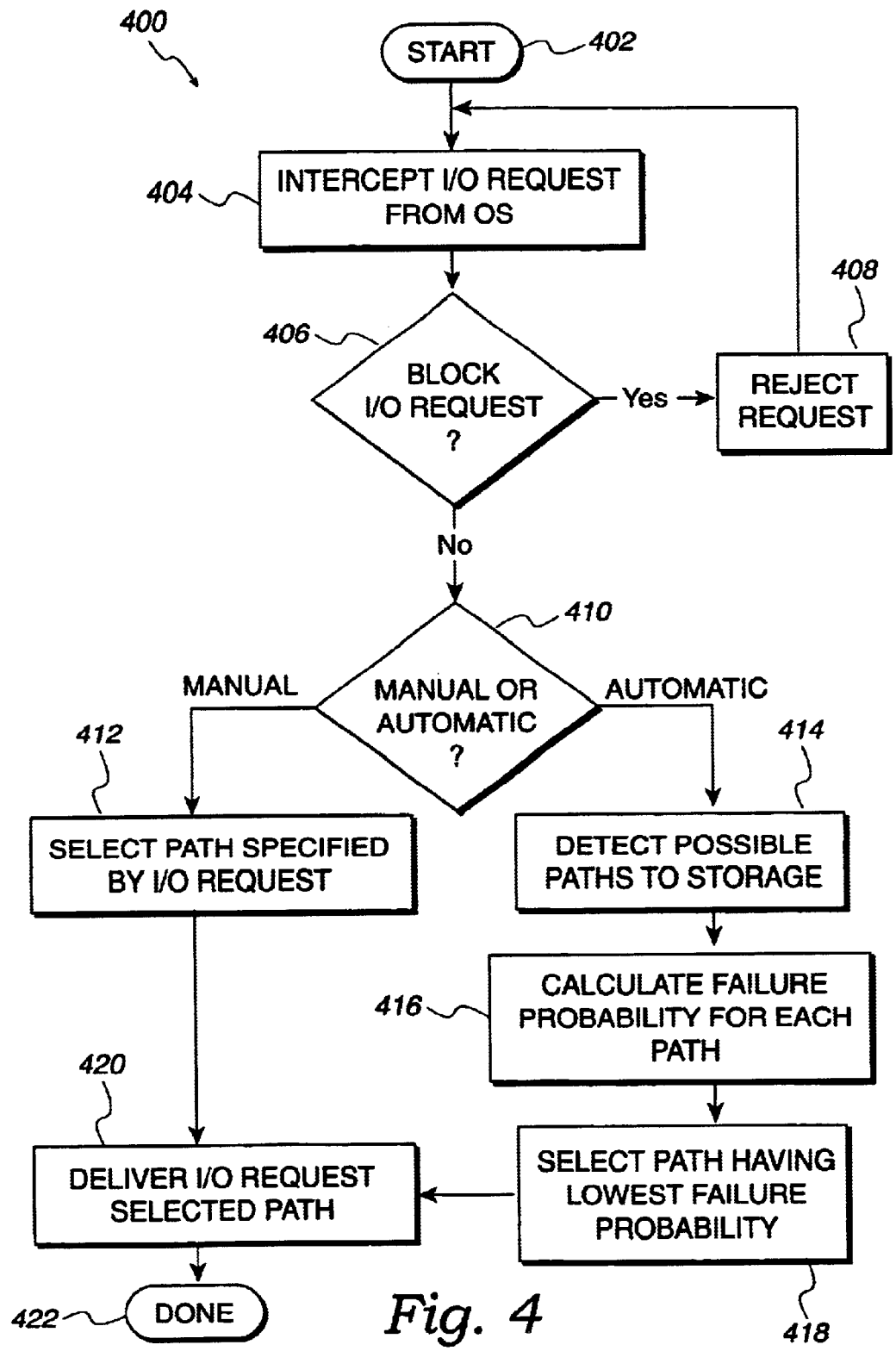
FIG. 4 is a flowchart showing a method for intelligent load balancing and failover in a multi-path computer system, in accordance with an embodiment of the present invention.

FIG. 4 is a flowchart showing a method 400 for intelligent load balancing and failover in a multi-path computer system, in accordance with an embodiment of the present invention. In an initial operation 402, pre-process operations are performed. Pre-process operations include provisioning the computer system and any associated computer networks, determining the set of device objects that will be under the control of the failover filter driver, and other pre-process operations that will be apparent to those skilled in the art.

In an interception operation 404, the failover filter driver intercepts an I/O request destined for a particular storage device from the OS. As mentioned previously, the failover filter driver is an intermediate kernal mode driver that exists above the device drivers, and below the class driver. The failover filter driver attaches any device objects it creates to the device objects created by the device drivers. I/O requests destined for a particular device driver and associated with a device object originally created by the device driver are sent to the failover filter driver, which is associated with the "attached" device object. In this manner, the failover filter driver is able to intercept I/O requests destined for the storage devices coupled to the computer system.

A decision is then made as to whether the I/O request should be blocked, in operation 406. Each received I/O request is associated with a particular device object, which is used by the system to perform the I/O request. The failover filter driver examines this device object to determine whether it is masked, as described in greater detail subsequently. The failover filter driver blocks I/O requests to masked device objects. If the I/O request is to blocked, the method 400 continues with a reject I/O operation 408, otherwise the method continues with operation 410.

In a reject I/O operation 408, the failover filter driver rejects the intercepted I/O request. Because the embodiments of the present invention allow devices to be accessed by multiple data paths, a single device could normally be mistaken as multiple devices by the file system. This is a result of each data path to a device causing a separate device object to be generated. The file system sees each device object as a separate physical device. Thus, embodiments of the present invention provide LUN masking to hide duplicate logical devices from the user, such that the user generally will only see one logical device for each physical device. It should be noted, however, that embodiments of the present invention can optionally not provide LUN masking for particular devices, depending on the needs of the computer system operator. Blocked I/O requests are rejected, thus hiding the blocked logical device. The method 400 then continues with another interception operation 404.

When the I/O request is not blocked, a decision is made as to whether the I/O request is set manual-path-selecting or automatic-path-selecting, in operation 410. Embodiments of the present invention are capable of performing both a manual-select device access, which allows an application to determine the data path to access the device, or an automatic-select access, wherein the failover filter driver determines the best data path to use in accessing the device. If the I/O request is a manual I/O request, the method 400 continues with a path selection operation 412. If the I/O request is an automatic I/O request, the method 400 continues with a detection operation 414.

In the path selection operation 412, the failover filter driver selects the data path specified by the I/O request. Manual device access allows an intelligent application program to set its own data path to the storage devices. This effectively moves the data path selection logic from the failover filter driver to the application program, which provides the extra flexibility needed by some users. In this manner, specific application programs can control the data path selection manually, while others leave the path selection determination to the failover filter driver. The I/O request is then delivered to the storage device using the selected data path in operation 420.

If the I/O request is an automatic-path-selecting I/O request, the failover filter driver detects the possible paths to the storage device associated with the I/O request, in a detection operation 414. During the detection operation 414, the failover filter driver detects the status of the various data paths capable of being used to access the requested storage device. For example, referring to back to FIG. 2B, if the failover filter driver 218 intercepted an I/O request to access storage device 204b, the failover filter driver 218 would detect the status of the two data paths capable of being used to access storage device 204b. Thus, the failover filter driver 218 would detect the status of data paths 208a and 208b from controllers 222a and 222b.

Referring back to FIG. 4, the failover filter driver calculates a failure probability for each previously detected data path, in a calculation operation 416. Using the detected data obtained in the detection operation 414, the failover filter driver can determine a probability of failure for each detected data path. The calculated probability of failure is further modified by the amount of I/O requests sent along each data path in the past. In one embodiment, the number of previous I/O requests sent along a particular path adds to the failure probability of that data path, thus decreasing the chance the data path will be selected with each I/O request that is sent along the data path. In this manner, embodiments of the present invention are able to balance the load along each data path, thus greatly decreasing the chances of a load imbalance occurring.

As described in greater detail subsequently, the failover filter driver uses both the prior and current status of each data path in calculating the probability of failure. In addition, embodiments of the present invention preferably weight the detected data to increase the accuracy of the probability calculation.

The path having the lowest probability of failure is then selected in a path selection operation 418. Having calculated the probability of failure for each detected data path, the failover filter driver then determines which of the detected data paths has the lowest probability of failure. This data path is then selected for use in transmitting the I/O request to the storage device. In this manner, failed data paths can be detected and I/O requests rerouted to alternate data paths, thus enabling continued operation of the computer storage system. The I/O request is then delivered to the storage device using the selected data path in operation 420.

Post process operations are performed in operation 422. Post process operations include network maintenance and other post process operations that will be apparent to those skilled in the art. Advantageously, the embodiments of the present invention provide intelligent load balancing in multi-path computer systems, which results in greatly increased reliability. Since multiple data paths to a particular storage device can increase the reliability of successful I/O requests to the device if properly balanced, the ability to automatically detect failures and perform load balancing among the data paths greatly increases system reliability.

Figure 5:
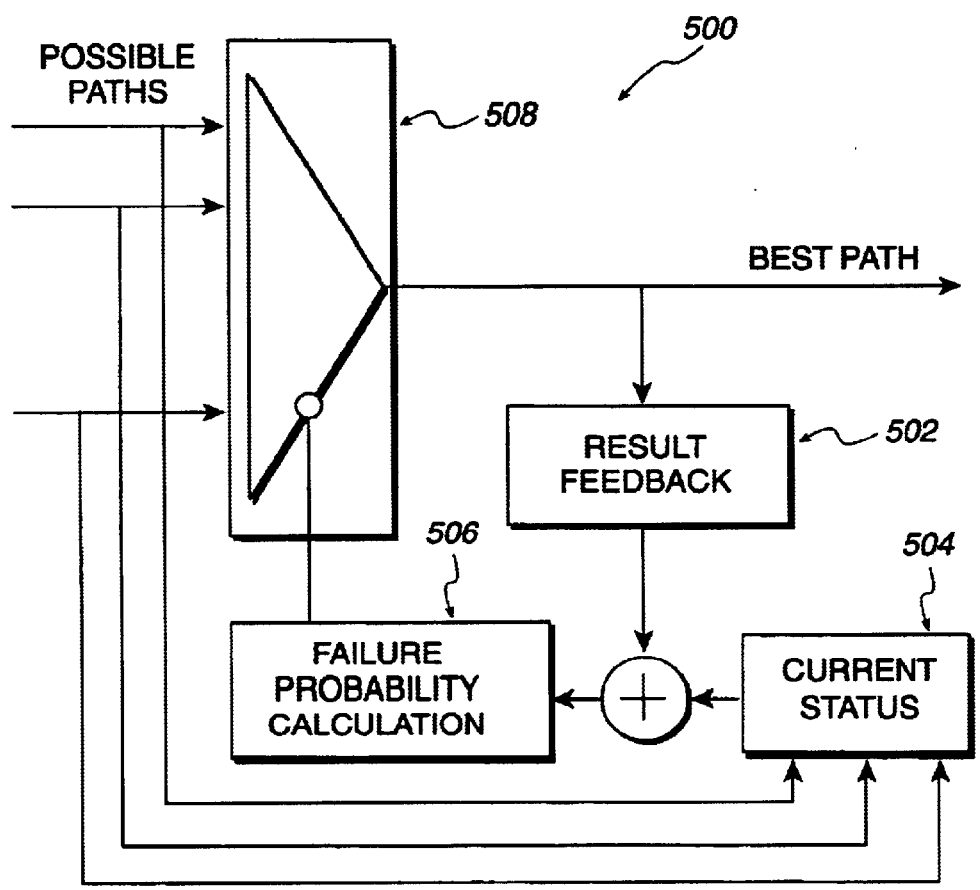
FIG. 5 is a block diagram showing a Policy Manager, in accordance with one embodiment of the present invention.

As previously stated, embodiments of the present invention can provide automatic routing of I/O requests based on the characteristics of the data paths available to deliver the I/O requests. FIG. 5 is a block diagram showing a Policy Manager 500, in accordance with one embodiment of the present invention. The Policy Manager 500 includes a result feedback system 502, a current state system 504, a failure probability calculation system, and a path selection system 508.

As shown in FIG. 5, the current status of the possible data paths providing access to the requested storage device are provided to both the path selection system 508 and the current status system 504. The current status includes information such as the busy status of the data path, the connection status, and any current errors. The current status for the possible data paths is then assembled using the current status system 504.

In addition, feedback from the last execution is provided to the result feedback system 502. The result feedback system 502 obtains the feedback from the previous execution and maintains a statistics on the prior behaviors of the data paths. The statistics maintained by the result feedback system 502 are then combined with the current status information from the current status system 504, and provided to the failure probability calculation system 506.

The failure probability calculation system 506 uses the statistics information and the current status information to calculate the failure probability for each possible data path providing access to the requested I/O device. As explained in greater detail subsequently, the failure probability system 506 assigns various weights to the statistics information and the current status information based on severity. These weighted values are then processed to provide load balancing and determine failure probability for each possible data path.

Having determined the failure probability of each data path, the path selection system 508 is used to select the data path having the lowest failure probability. Advantageously, the automatic routing provided by the embodiments of the present invention provides both I/O failure prevention and load balancing. Thus, when automatic routing is enabled the Policy Manager 500 determines which data path to use for intercepted I/O requests. To determine the failure probability for each data path, the failure probability system uses the current link state, the feedback from the last execution, the load on each data path, and the availability of the data paths, as described in greater detail next.

Figure 6:
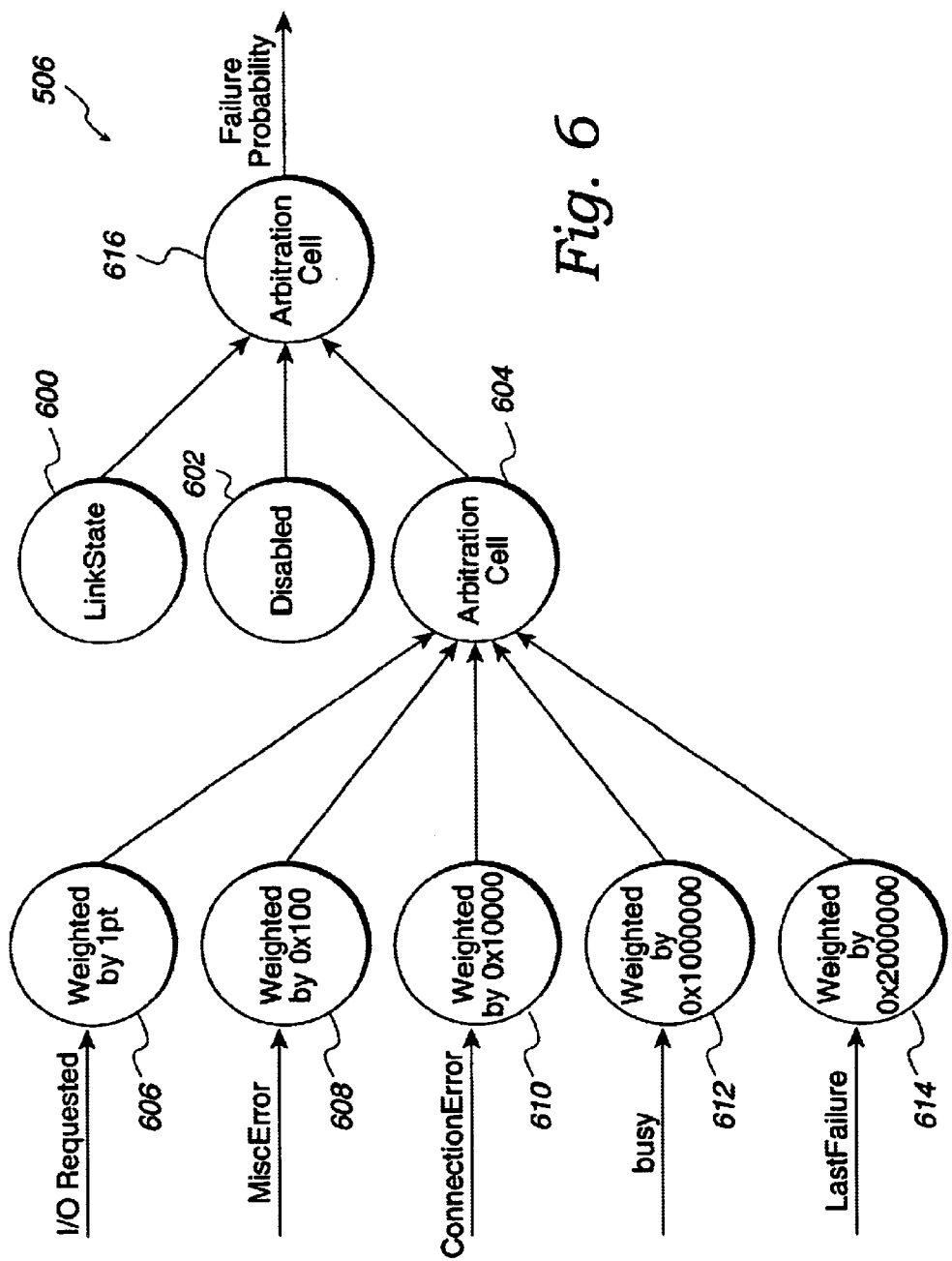
FIG. 6 is a logical diagram showing an exemplary failure probability system, in accordance with an embodiment of the present invention.

FIG. 6 is a logical diagram showing an exemplary failure probability system 506, in accordance with an embodiment of the present invention. The failure probability system 506 includes three major cells, namely, the LinkState cell 600, the Disabled cell 602, and Statistics Arbitration cell 604. Each of these cells can add to the failure probability depending on weighted value of the cell, which is based on the severity of the event or status represented by the cell.

For example, a path would have a very high probability of failure if the link is not up, hence the LinkState cell 600 generally is weighted very high. In addition, if an operator decides to manually disable a particular path, the system preferably avoids using that particular data path. Thus, the Disable cell 602 also is weighted high, although the Disable cell 602 often is weighted slightly lower than the LinkState cell 600. However, it should be noted that there may be reasons to weight the Disable cell 602 equal to the LinkState cell 600, or even higher than the LinkState cell 600. For this reason, the weights presented in this and the following discussion are for exemplary purposes only. Actual weight values would depend on the exact application in which the embodiments of the present invention are used, as will be apparent to those skilled in the art.

If the LinkState cell 600 is LinkUp, meaning the data path is connected and running, and the data path is not disabled, as determined by the Disable cell 602, the Statistics Arbitration cell 604 determines the failure probability for the data path. The Statistics Arbitration cell 604 has five child cells, which provide weighted statistics for determining the failure probability. These five child cells include an I/O Requested cell 606, a MiscError cell 608, a ConnectionError cell 610, a Busy cell 612, and a LastFailure cell 614.

The I/O Requested cell 606 represents the number of I/O requests that have been executed in the past using the particular data path. The I/O Requested cell 606 is used primarily for load balancing, and thus generally has the lowest weight of the child cells. For example, the exemplary failure probability system 506 of FIG. 6 shows the I/O Requested cell 606 having a weight of "one."

Typically, the I/O requested cell 606 determines path selection when most of the remaining child cells are the same for all the possible data paths providing access to the requested storage device. In this manner, when most of the remaining child cells are the same, the data path having the least amount of prior I/O requests generally will have the lowest probability of failure, and thus be selected by the Policy Manager as the path to use to deliver the I/O request. Since even a heavily used data path should be chosen over a lighter used failed data path, the I/O requested cell 606 typically is assigned a lower weight value than other cells.

For example, FIG. 6 shows the MiscError cell 608 having a weight of 0x100. Thus, when choosing between a first data path having a fifty prior I/O requests and a second data path having ten prior I/O requests but also having one Miscellaneous error, the failure probability system 506 will assign the second data path a higher probability of failure. This would result in the first data path being chosen by the Policy Manager even though it has a higher load than the second data path, as would be desired since the second data path encountered a previous error.

The MiscError cell 608 represents the number of miscellaneous errors that have occurred along the data path in the past. It should be borne in mind that the errors represented by the MiscError cell 608 are errors that are not represented by the other child cells. The exemplary failure probability system 506 shows the MiscError cell 608 having a weight of about 0×100, indicating this type of error to be of medium severity.

The ConnectionError cell 610 represents the total possible channel failures for the data path. Each possible channel failure generally is a serious connection failure, each of which could represent a possible physical failure along the data path. For example, the exemplary failure probability system 506 shows the ConnectionError cell 610 having a weight of about 0×10000, illustrating the relative severity of this type of error.

The Busy cell 612 is used to represent the current busy state of the data path. When the data path is currently busy, the state of the Busy cell 612 is set to TRUE indicating the data path is currently in use processing I/O requests. In this case, another data path should generally be chosen. To this end, the Busy cell 612 has a relatively high weight assigned to it. For example, the exemplary failure probability system 506 shows the Busy cell 608 having a weight of about 0×1000000.

The LastFailure cell 614 is used to represent the last failure state of the data path. If the data path encountered a possible connection error during the last execution, the LastFailure cell 614 state is set to TRUE. For example, the exemplary failure probability system 506 shows the LastFailure cell 614 having a weight of about 0×2000000, illustrating the very high severity of this type of error.

As stated previously, the Statistics Arbitration cell 604 determines the failure probability for the data path using the five child cells, which provide weighted statistical and current information to the Statistics Arbitration cell 604 for failure probability calculation. The information from the Statistics Arbitration cell 604, the Disabled cell 602, and the LinkState cell 600 is then combined in a Failure Probability Arbitration cell 616, which provides the failure probability for the data path to the rest of the system. It should be noted that the above described failure probability system 506 is for exemplary purposes, and thus other cell types may be used to determine failure probability depending on the exact nature of the application it is used.

Figure 7:
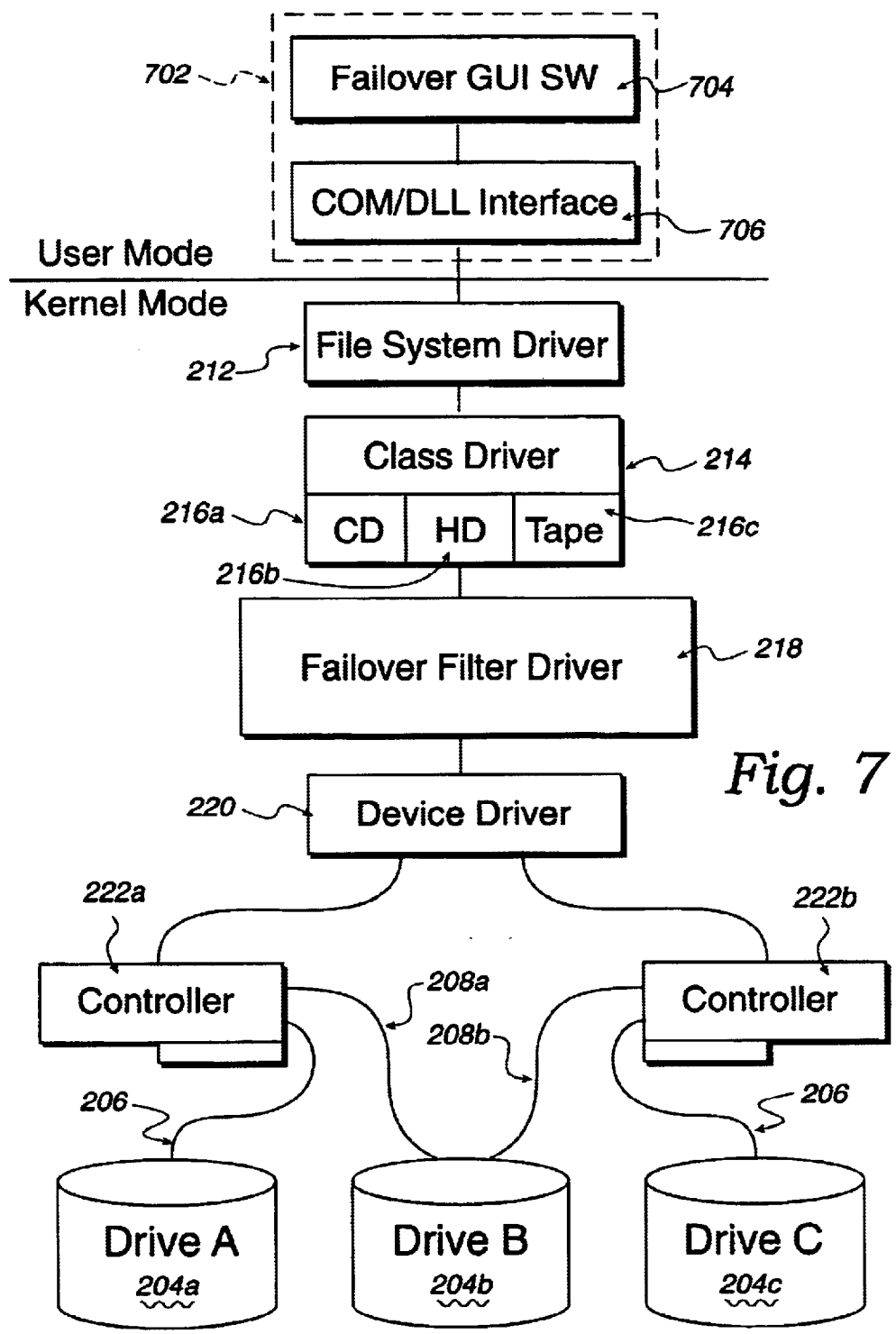
FIG. 7 is an illustration showing a multi-path computer storage system having a segregated interface to configure an intelligent load balancing and failover system, in accordance with an embodiment of the present invention

FIG. 7 is an illustration showing a multi-path computer storage system 700 having a segregated interface to configure an intelligent load balancing and failover system, in accordance with an embodiment of the present invention. The multi-path computer storage system 700 includes a segregated user interface 702 executing in an OS environment having a file system driver 212. In communication with the file system driver 212 is a class driver 214. The class driver 214 is also in communication with a failover filter driver 218, which manages and delivers I/O requests to device driver 220. The device driver 220 provides communication to controllers 222a and 222b, which are coupled to, and control, storage devices 204a, 204b, and 204c.

The segregated user interface 702 comprises a failover graphical user interface (GUI) module 704 and a component object module (COM)/dynamic link library (DLL) interface module 706. The failover GUI module 704 allows the user to configure parameters for the failover filter driver 218. In one embodiment, the failover GUI module 704 uses the System Registry to store the configured parameters for the failover filter driver 218, which uses the parameters to initialize and configure the computer storage. The COM/DLL interface module 706 interfaces with the actual computer system, thus providing the segregated user interface 700 with separation, which allows changing of the failover GUI module 704 without affecting the features and functionality of the COM/DLL interface module 706. Similarly, the separation also allows changing of the features and functionality of the COM/DLL interface module 706 without affecting the failover GUI module 704.

The segregated user interface 702 provides the user access to the failover filter driver 218 settings, and further provides the user with information concerning the system and network over which the failover filter driver 218 is executing. In one embodiment, the segregated user interface 702 provides information on the network. For example, in a Fibre Channel environment the segregated user interface 702 can provide the user with information concerning the Fibre Channel host bus adapters and connecting devices controlled by the Fibre Channel host bus adapters. In addition, the segregated user interface 702 can be used to configure LUN masking and failover for the system. Further, the segregated user interface 702 can be used show failover status and statistics. Thus, the segregated user interface 702 can be used as a utility tool to help configure LUN masking and failover.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for intelligent load balancing in a multi-path computer system, comprising the operations of:

intercepting an input/output (I/O) request to access the computer I/O device;

detecting a number of I/O requests that have been sent along each data path of a plurality of data paths providing access to the computer I/O device;

calculating a failure probability for each data path of the plurality of data paths based on the number of I/O requests that have been sent along each data path;

selecting a data path from the plurality of data paths having a failure probability lower than the failure probability of other data paths of the plurality of data paths; and accessing the computer I/O device using the selected data path.

2. A method as recited in claim 1, wherein the failure probability for each data path is further based on further characteristics of each data path in the plurality of data paths.

3. A method as recited in claim 2, wherein the characteristics include a current status of each data path.

4. A method as recited in claim 3, wherein the characteristics further include statistical information concerning past performance of each data path.

5. A method as recited in claim 4, wherein the number of I/O requests that have been sent along each data path and the characteristics of each data path are weighted.

6. A method as recited in claim 5, wherein the characteristics are weighted based on a severity of each characteristic.

7. A method as recited in claim 6, wherein a weight of the number of I/O requests is lower than the weights of any other characteristic of a data path.

8. A system for providing intelligent load balancing in a multi-path computer system, comprising:

a processor;

a computer input/output (I/O) device in communication with the processor via a plurality of data paths; and a failover filter driver in communication with the plurality of data paths, the failover filter driver capable of determining a number of I/O requests previously sent using each data path in the plurality of data paths, the failover filter driver further capable of selecting a particular data path from the plurality of data paths based on the number of I/O requests sent using each data path, the failover filter driver being capable of calculating a failure probability for each data path of the plurality of data paths based on the number of I/O requests that have been sent along each data path.

9. A system as recited in claim 8, wherein the failover filter driver also selects the particular data path from the plurality of data paths based on further characteristics of each data path in the plurality of data paths.

10. A system as recited in claim 9, wherein the characteristics include a current status of each data path.

11. A system as recited in claim 10, wherein the characteristics further include statistical information concerning past performance of each data path.

12. A system as recited in claim 11, wherein the number of I/O requests previously sent using each data path in the plurality of data paths and the characteristics of each data path are weighted.

13. A system as recited in claim 12, wherein the characteristics are weighted based on a severity of each characteristic.

14. A system for providing intelligent load balancing in a multi-path computer system, comprising:

a processor;

a computer input/output (I/O) device in communication with the processor via a plurality of data paths; and a failover filter driver in communication with the plurality of data paths, the failover filter driver capable of determining a number of I/O requests previously sent using each data path in the plurality of data paths, the failover filter driver further capable of selecting a particular data path from the plurality of data paths based on the number of I/O requests sent using each data path, the failover filter driver also selecting the particular data path from the plurality of data paths based on further characteristics of each data path in the plurality of data paths, the characteristics including a current status of each data path, and the characteristics further including statistical information concerning past performance of each data path, the number of I/O requests previously sent using each data path in the plurality of data paths and the characteristics of each data path being weighted, the characteristics being weighted based on a severity of each characteristic, wherein a weight of the number of I/O requests is lower than the weights of any other characteristic of a data path.

15. A computer readable media having program instructions for providing intelligent load balancing in a multi-path computer system, comprising:

program instructions for intercepting input/output (I/O) requests to a computer I/O device from an operating system;

program instructions for selecting a data path from a plurality of data paths to the computer I/O device based on data path information provided from a requesting computer application; and program instructions for selecting a data path from the plurality of data paths based on a number of I/O requests previously sent along each data path in the plurality of data paths and for calculating a failure probability for each data path of the plurality of data paths based on the number of I/O requests that have been sent along each data path.

16. A computer readable media as recited in claim 15, further comprising program instructions for assigning the failure probability to each data path in the plurality of data paths to the I/O device that are in communication with program instructions for selecting the data path from the plurality of data paths based on the number of I/O requests previously sent along each data path in the plurality of data paths.

17. A computer readable media as recited in claim 16 wherein the failure probability for a particular data path is also based on characteristics of the particular data path.

18. A computer readable media as recited in claim 17, wherein the characteristics include a current status of the data path.

19. A computer readable media as recited in claim 18, wherein the characteristics further include statistical information concerning past performance of the data path.

20. A computer readable media as recited in claim 19, wherein the selected data path has a failure probability lower than the failure probability of other data paths in the plurality of data paths to the computer I/O device.

21. A method for intelligent load balancing in a multi-path computer system, comprising the operations of:

intercepting an input/output (I/O) request to access the computer I/O device;

detecting an amount of I/O requests that have been sent along each data path of a plurality of data paths providing access to the computer I/O device, wherein the plurality of data paths to the computer I/O device is represented to a user as a single logical computer I/O device;

calculating a failure probability for each data path of the plurality of data paths based on the an amount of I/O requests that have been sent along each data path and on further characteristics of each data path in the plurality of data paths, the characteristics including current status of each data path and statistical information concerning past performance of each data path;

selecting a data path from the plurality of data paths having a failure probability lower than the failure probability of other data paths of the plurality of data paths; and accessing the computer I/O device using the selected data path.

22. A method as recited in claim 21, wherein the number of I/O requests that have been sent along each data path and the characteristics of each data path are weighted.

23. A method as recited in claim 22, wherein the characteristics are weighted based on a severity of each characteristic.

24. A method as recited in claim 23, wherein a weight of the number of I/O requests is lower than the weights of any other characteristic of a data path.

25. A system for providing intelligent load balancing in a multi-path computer system, comprising:

a processor;

a computer input/output (I/O) device in communication with the processor via a plurality of data paths;

a user interface module in communication with the plurality of data paths, the user interface module capable of representing the plurality of data paths to the computer I/O device as a single logical computer I/O device; and a failover filter driver in communication with the plurality of data paths, the failover filter driver capable of determining a number of I/O requests previous sent using each data path in the plurality of data paths, the failover filter driver further capable of selecting a particular data path from the plurality of data paths based on the number of I/O requests sent using each data path and characteristics of each data path in the plurality of data paths, and the failover filter driver also capable of calculating a failure probability for each data path of the plurality of data paths based on the number of I/O requests that have been sent along each data path.

26. A system as recited in claim 25, wherein the characteristics include a current status of each data path.

27. A system as recited in claim 26, wherein the characteristics further include statistical information concerning past performance of each data path.

28. A computer readable media having program instructions for providing intelligent load balancing in a multi-path computer system, comprising:

program instructions for intercepting input/output (I/O) requests to a computer I/O device from an operating system;

program instructions for selecting a data from a plurality of data paths to the computer I/O device based on data path information provided from a requesting computer application;

program instructions for assigning a failure probability to each data path in the plurality of data paths to the I/O device, wherein the failure probability is based on a number of I/O requests previously sent along each data path in the plurality of data paths and on characteristics of each data path; and program instructions for selecting a data path from the plurality of data paths, the selected data path having a failure probability that is lower than the failure probability of other data paths in the plurality of data paths.

29. A computer readable media as recited in claim 28, wherein the characteristics include a current status of the data path.

30. A computer readable media as recited in claim 29, wherein the characteristics further include statistical information concerning past performance of the data path.

31. A computer readable media as recited in claim 28 wherein the failure probability for a particular data path is based on the number of I/O requests previously sent along the particular data path and.

* * * * *